US011188189B1

(12) United States Patent
Philbrick et al.

(10) Patent No.: US 11,188,189 B1
(45) Date of Patent: *Nov. 30, 2021

(54) SYSTEM AND METHOD FOR DATA VISUALIZATION AND MODIFICATION IN AN IMMERSIVE THREE DIMENSIONAL (3-D) ENVIRONMENT

(71) Applicant: United Services Automobile Association (USAA), San Antonio, TX (US)

(72) Inventors: Ashley Raine Philbrick, San Antonio, TX (US); Alexis Maldonado, San Antonio, TX (US); Micah Ray Pearce, San Antonio, TX (US); Stephen Seyler Aultman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,589

(22) Filed: Dec. 7, 2020

Related U.S. Application Data

(63) Continuation of application No. 16/597,658, filed on Oct. 9, 2019, now Pat. No. 10,860,170, which is a
(Continued)

(51) Int. Cl.
*G06T 19/00* (2011.01)
*G06F 3/0481* (2013.01)
(Continued)

(52) U.S. Cl.
CPC .......... *G06F 3/04815* (2013.01); *G06F 3/017* (2013.01); *G06F 3/167* (2013.01);
(Continued)

(58) Field of Classification Search
None
See application file for complete search history.

(56) References Cited

U.S. PATENT DOCUMENTS 5,555,354 A 9/1996 Strasnick et al.
5,720,018 A 2/1998 Muller et al.
(Continued)

FOREIGN PATENT DOCUMENTS

WO 2000014574 3/2000

OTHER PUBLICATIONS

Porof, Victor, "Debugging and editing webpages in 3D", Website: https://hacks.mozilla.org/2011/10/debugging-and-editing-webpages-in-3d/#availableasanaddon, Oct. 26, 2011, pp. 1-7.
(Continued)

*Primary Examiner* — Sultana M Zalalee
(74) *Attorney, Agent, or Firm* — Fletcher Yoder, P.C.

(57) ABSTRACT

A computer programming system includes a processor configured to receive computer code in a textual format, and cause a 3-D visual representation of a portion of an immersive 3-D environment to be displayed via a 3-D visual instrumentation, where the 3-D visual representation comprises a visualization of the computer code in the textual format. The system also includes the three-dimensional (3-D) visual instrumentation, communicatively coupled with the processor, and configured to receive the 3-D visual representation, and to present the 3-D visual representation. The system also includes a motion detection instrumentation communicatively coupled with the processor, where the motion detection instrumentation is configured to receive a motion input, and where the 3-D visual representation within the immersive 3-D environment is adjusted based on the motion input. The system also includes an input device communicatively coupled with the processor, where the
(Continued)

input device is configured to enable modifications to the computer code, and where the processor is configured to incorporate the modifications to the computer code into the immersive 3-D environment.

20 Claims, 6 Drawing Sheets

Related U.S. Application Data continuation of application No. 15/474,973, filed on Mar. 30, 2017, now Pat. No. 10,452,227.

(60) Provisional application No. 62/316,184, filed on Mar. 31, 2016.

(51) Int. Cl.
| | | |
|---|---|---|
| *G06F 3/16* | (2006.01) | |
| *G06T 19/20* | (2011.01) | |
| *G06F 8/34* | (2018.01) | |
| *G06F 40/106* | (2020.01) | |
| *G06F 3/01* | (2006.01) | |

(52) U.S. Cl.
CPC ............. *G06F 8/34* (2013.01); *G06F 40/106* (2020.01); *G06T 19/003* (2013.01); *G06T 19/20* (2013.01); *G06T 2200/24* (2013.01)

(56) References Cited

U.S. PATENT DOCUMENTS

| | | | |
|---|---|---|---|
| 5,739,824 | A | 4/1998 | Dietrich et al. |
| 6,373,488 | B1 | 4/2002 | Gasper et al. |
| 6,473,080 | B1 | 10/2002 | Brown et al. |
| 7,168,051 | B2 | 1/2007 | Robinson et al. |
| 8,065,658 | B1 | 11/2011 | Bali et al. |
| 8,434,013 | B2 | 4/2013 | Stevens |
| 9,071,520 | B2 | 6/2015 | Bak et al. |
| 10,452,227 | B1 | 10/2019 | Philbrick et al. |
| 10,860,170 | B1 * | 12/2020 | Philbrick ................ G06F 3/167 |
| 2002/0178096 | A1 | 11/2002 | Marshall |
| 2007/0211056 | A1 | 9/2007 | Chakraborty et al. |
| 2008/0246757 | A1 * | 10/2008 | Ito .......................... G06T 19/00 345/419 |
| 2011/0131209 | A1 | 6/2011 | Bechtel et al. |
| 2012/0280893 | A1 | 11/2012 | Halokovszky |
| 2012/0326961 | A1 | 12/2012 | Bromer |
| 2013/0205275 | A1 | 8/2013 | Thomson et al. |
| 2014/0282013 | A1 | 9/2014 | Amijee |
| 2014/0282385 | A1 | 9/2014 | Dattke |
| 2015/0153897 | A1 * | 6/2015 | Huang ................ G06F 3/0418 345/173 |
| 2015/0156716 | A1 | 6/2015 | Raffle et al. |
| 2015/0187355 | A1 | 7/2015 | Parkinson et al. |
| 2015/0288944 | A1 | 10/2015 | Nistico et al. |
| 2016/0012631 | A1 | 1/2016 | Kim et al. |
| 2016/0077831 | A1 | 3/2016 | Mihalcea et al. |
| 2017/0109933 | A1 | 4/2017 | Voorhees et al. |

OTHER PUBLICATIONS

"3D view", Website: https://developer.mozilla.org/en-US/docs/Tools/3D_View, pp. 1-3 (Accessed on Nov. 6, 2015).

Porof, Victor, et al., "Tilt 3D Add-ons" Website: https://addons.mozilla.org/en-us/firefox/addon/tilt/, pp. 1-2 (Accessed on Nov. 6, 2015).

Bonyuet, David, Matt Ma, and Kamal Jaffrey. "3D visualization for software development." Proceedings. IEEE International Conference on Web Services, 2004 . . . IEEE, 2004.

Reiss, Steven P. "An engine for the 3D visualization of program information." Journal of Visual Languages & Computing 6.3 (1995): 299-323.

Fittkau, Florian, Alexander Krause, and Wilhelm Hasselbring. "Exploring software cities in virtual reality." 2015 ieee 3rd working conference on software visualization (vissoft). IEEE, 2015.

Elliott, Anthony, Brian Peiris, and Chris Parnin. "Virtual reality in software engineering: Affordances, applications, and challenges." 2015 IEEE/ACM 37th IEEE International Conference on Software Engineering. vol. 2. IEEE, 2015.

A. Bragdon, S. P. Reiss, R. Zeleznik, S. Karurnuri, W. Cheung, J. Kaplan, C. Coleman, F. Adeputra, and J. J. LaViola, Jr. Code bubbles: Rethinking the user interface paradigm of integrated development environments. In Proc, of the 32nd ACM/IEEE ICSE vol. 1, ICSE '10, pp. 455-464, New York, NY, USA, 2010. ACM.

Staples, Mathew L. and Biernan, James M . . . 3-D Visualization of Software Structure. Advances in Computers, vol. 49, Academic Press, London, 1999.

Rekimoto, Jun, and Mark Green. "The information cube: Using transparency in 3d information visualization." Proceedings of the Third Annual Workshop on Information Technologies & Systems (WITS'93). 1993.

\* cited by examiner

SYSTEM AND METHOD FOR DATA VISUALIZATION AND MODIFICATION IN AN IMMERSIVE THREE DIMENSIONAL (3-D) ENVIRONMENT

CROSS REFERENCE TO RELATED APPLICATION

This application is a continuation of U.S. patent application Ser. No. 16/597,658 filed Oct. 9, 2019, entitled "System and Method for Data Visualization and Modification in an Immersive Three Dimensional (3-D) Environment," which is a continuation of U.S. patent application Ser. No. 15/474,973, filed Mar. 30, 2017, now U.S. Pat. No. 10,452,227, entitled "System and Method for Data Visualization and Modification in an Immersive Three Dimensional (3-D) Environment," which claims the benefit of U.S. Provisional Application No. 62/316,184, entitled "System and Method for Data Visualization and Modification in an Immersive Three Dimensional (3-D) Environment," filed Mar. 31, 2016, all of which are hereby incorporated by reference in their entireties for all purposes.

BACKGROUND

The present disclosure relates generally to systems and methods for data visualization and modification in an immersive three-dimensional (3-D) environment (e.g., via virtual reality). More specifically, the present disclosure relates to analyzing and modifying data (e.g., computer code) relationships via virtual reality (VR) tools.

Data visualization and modification is prevalent in the modern technological world. For example, computer programming (e.g., computer coding) involves analyzing and modifying lines of code (e.g., programming language) to maintain, enable, or change processing methods, where each line of code may include various relationships (e.g., process relationships) with other lines of code. Many digital technologies utilize computer code to run various digital processes associated with data storage, data analyzation, financial transactions, gaming, and the like. As programming continues to evolve, coding may become increasingly complicated. For example, computer programs may continue to increase in size (e.g., more code) and increase in complexity. Unfortunately, relationships between various portions of a data set (e.g., computer code) may be difficult to perceive with traditional data visualization tools. Accordingly, an improved data visualization (e.g., computer programming) environment may be desirable.

BRIEF DESCRIPTION

In a first embodiment, A computer programming system includes a processor configured to receive computer code in a textual format, and cause a 3-D visual representation of a portion of an immersive 3-D environment to be displayed via a 3-D visual instrumentation, where the 3-D visual representation comprises a visualization of the computer code in the textual format. The system also includes the three-dimensional (3-D) visual instrumentation, communicatively coupled with the processor, and configured to receive the 3-D visual representation, and to present the 3-D visual representation. The system also includes a motion detection instrumentation communicatively coupled with the processor, where the motion detection instrumentation is configured to receive a motion input, and where the 3-D visual representation within the immersive 3-D environment is adjusted based on the motion input. The system also includes an input device communicatively coupled with the processor, where the input device is configured to enable modifications to the computer code, and where the processor is configured to incorporate the modifications to the computer code into the immersive 3-D environment.

A second embodiment includes a tangible, non-transitory, machine-readable medium, having machine-readable instructions for displaying computer programming logic in an immersive three-dimensional (3-D) environment. The machine-readable instructions include instructions to receive, via one or more processors, computer programming logic. The machine-readable instructions also include instructions to generate, via the one or more processors, a 3-D representation of the computer programming logic. The machine-readable instructions also include instructions to present the 3-D representation of the computer programming logic to 3-D visual instrumentation communicatively coupled with the one or more processors, such that the 3-D representation of the computer programming logic is presented by the 3-D visual instrumentation in a 3-D visual representation of a portion of the immersive 3-D environment. The machine-readable instructions also include instructions to receive, from motion detection instrumentation, a motion input from a user. The machine-readable instructions also include instructions to adjust and present, via the one or more processors and based on the motion input from the user, a perspective of the user within the immersive 3-D environment by changing the 3-D visual representation within the immersive 3-D environment, such that a segment of the 3-D representation of the computer programming logic that is not viewable in a first iteration of the 3-D visual representation is viewable by the user in a second iteration of the 3-D visual representation after the adjustment. The machine-readable instructions also include instructions to present relationship data indicative of relationships between portions of the 3-D representation of the computer programming logic to the 3-D visual instrumentation, such that the 3-D visual instrumentation presents an indication of the relationships between the portions of the 3-D representation of the computer programming logic in the 3-D visual representation.

In a third embodiment, a method includes receiving, via one or more processors, computer code. The method also includes generating, via the one or more processors, a three-dimensional (3-D) computer code representation of the computer code, and determining, via the one or more processors, a relationship between portions of the 3-D computer code representation. The method also includes generating viewable relationship data corresponding to the 3-D computer code representation, and presenting visualization data that causes display of the 3-D computer code representation and the viewable relationship data in an immersive 3-D environment. A wearable virtual reality headset communicatively coupled with the one or more processors, and having a 3-D visual instrumentation and a motion detection instrumentation, is configured to display the 3-D computer code representation and the viewable relationship data in a 3-D visual representation of a portion of the immersive 3-D environment. The motion detection instrumentation is configured to enable a user of the virtual reality computer programming system to adjust a perspective of the user within the immersive 3-D environment by changing the 3-D visual representation displayed by the 3-D visual instrumentation. An input device, communicatively coupled with the one or more processors, is configured to enable the user to add to, delete from, or otherwise modify the 3-D computer code to generate a modified 3-D computer code representation disposable and viewable in the immersive 3-D environment.

DRAWINGS

These and other features, aspects, and advantages of the present disclosure will become better understood when the following detailed description is read with reference to the accompanying drawings in which like characters represent like parts throughout the drawings, wherein.

Figure 1:
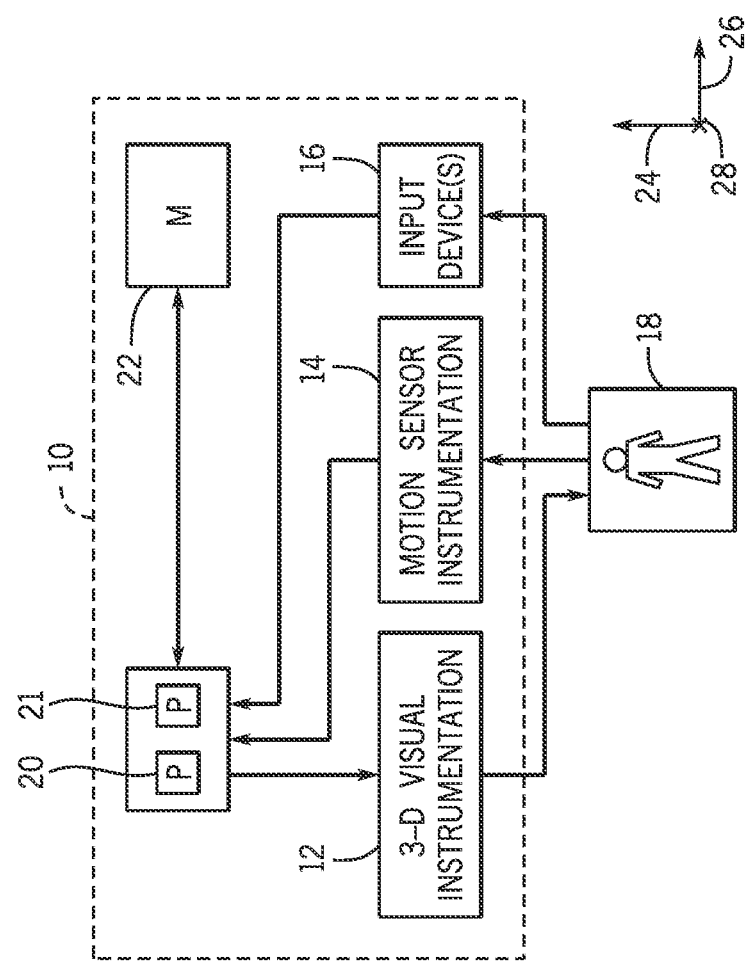
FIG. 1 is a schematic illustration of an embodiment of a system for data (e.g., computer code) visualization and modification in an immersive three-dimensional (3-D) environment, in accordance with an aspect of the present disclosure.
Figure 6:
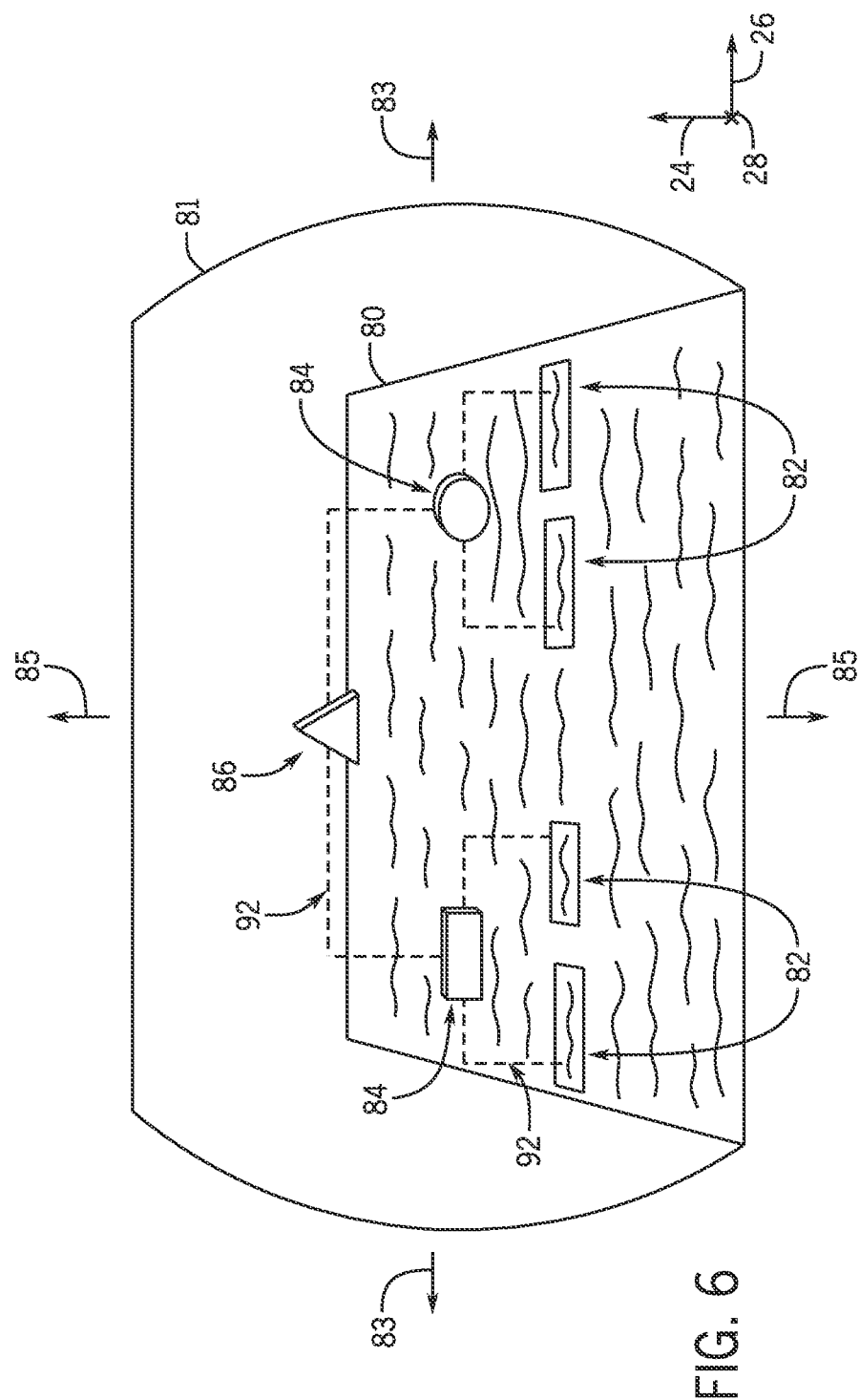
Figure 7:
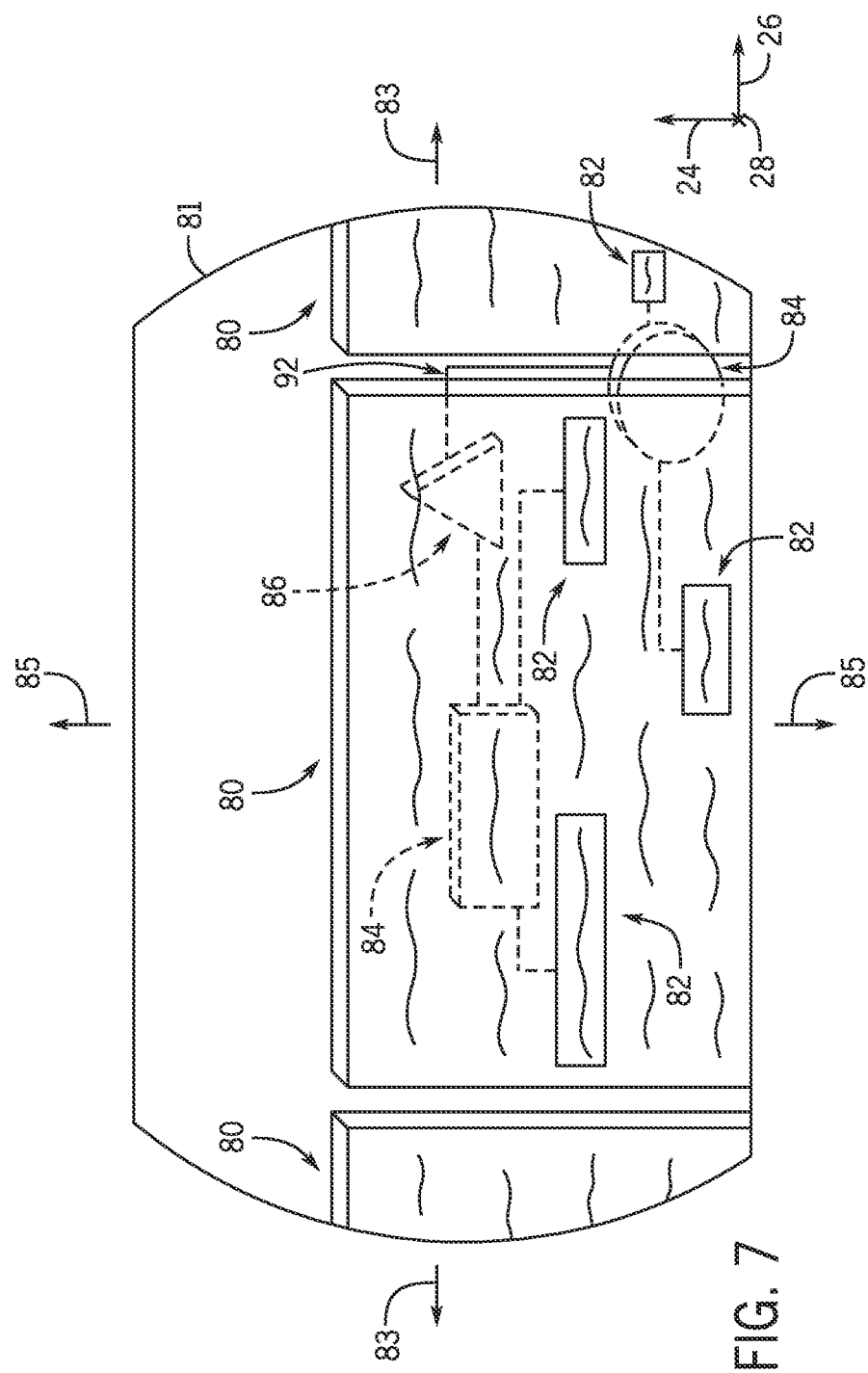

FIG. 6 is a perspective schematic illustration of an embodiment of the immersive 3-D environment provided by the system of FIG. 1 from a user perspective, in accordance with an aspect of the present disclosure; and FIG. 7 is a perspective schematic illustration of an embodiment of the immersive 3-D environment provided by the system of FIG. 1 from a user perspective, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward systems and methods for facilitating data visualization and modification in an immersive three dimensional (3-D) environment (e.g., via virtual reality). Specifically, systems and methods in accordance with present embodiments may be directed to virtual reality tools that facilitate computer programming in the immersive 3-D environment. "Immersive 3-D environment" used herein may refer to an environment having a 3-D visual representation in computer graphics viewable by a user. "3-D visual representation" may correspond with a given viewable portion (e.g., window, segment, or slice) of the immersive 3-D environment, and may correspond with a perspective of the user within the immersive 3-D environment. In other words, while the immersive 3-D environment may include a 360 degree environment, the 3-D visual representation may include a portion (e.g., slice) of the 360 degree environment. For example, the user may be situated within the immersive 3-D environment and, at any time, the user may perceive a given 3-D visual representation based on the location and perspective (e.g., orientation) of the user.

In accordance with the present disclosure, the user may be capable of modifying the 3-D visual representation by adjusting his or her position and/or perspective (e.g., through movement of his or her head), such that motion detectors detect the user's movement, and adjust the user's position and/or perspective (e.g., the 3-D visual representation) within the immersive 3-D environment. The user may also be capable of modifying data or other features displayed in the immersive 3-D environment and perceived by the user in the 3-D visual representation. Specifically, the user may be capable of modifying computer code (and corresponding viewable relationships between portions of the computer code) in the immersive 3-D environment, in accordance with the description below.

Systems configured to enable the immersive 3-D environment may include visual instrumentation, such as virtual reality goggles. However, other visual instrumentation may also be used, such as glasses with specially designed lenses that enable the perception of a 3-D visual representation (e.g., a portion of the immersive 3-D environment) projected from a two dimensional (2-D) screen (e.g., television). In general, the visual instrumentation may include one display that receives a first image or video feed ("first feed") (e.g., associated with a user's right eye) and a second image or video feed ("second feed") (e.g., associated with a user's left eye). Alternatively, the visual instrumentation may include a first display that receives the first feed (e.g., associated with the user's right eye) and a second display that receives the second feed (e.g., associated with the user's left eye). The visual instrumentation may also include first and second lenses corresponding with the first and second feeds (and, thus, the user's right and left eyes, respectively), where the first and second lenses are positioned between the user and the display(s). The first and second lenses may be positioned, angled, or otherwise designed (e.g., to include variable thickness, curves, etc.) to focus and/or reshape the first and second feeds, creating a stereoscopic 3-D image (or video) viewed by the user.

Further, the system may include motion sensor instrumentation, which may be incorporated in full or in part with the visual instrumentation (e.g., into a single pair of goggles), or may be standalone instrumentation from the virtual reality visual instrumentation. In general, the motion sensor instrumentation may be a wearable device, such as headgear, a glove, or another type of wearable device, configured to capture and/or track motion of the user (e.g., the user's head). For example, the virtual reality goggles having the visual instrumentation may include the motion sensor instrumentation disposed therein or thereon, and as the user of the virtual reality goggles turns his or her head, the motion sensor instrumentation detects the turning of the virtual reality goggles by way of the user's motion.

A processor of the system may receive, from the motion sensor instrumentation, data indicative of the motion. The processor may adjust the first feed, the second feed, the angle of the lenses, or a combination thereof in real time to shift the 3-D visual representation (and, thus, the user perspective within the 3-D environment), in accordance with the user's motion. In other words, as the user turns his or her head, the user's perspective (e.g., the 3-D visual representation) within the immersive 3-D environment changes (e.g., shifts) in accordance with the user's movement.

The system may also include a memory communicatively coupled with the processor. The memory may store instructions that, when executed by the processor, cause the processor to perform certain acts. For example, as previously described, the processor may execute instructions stored to the memory such that the processor feeds the 3-D visual representation of the immersive 3-D environment to the visual instrumentation of the system. Further, the processor may execute instructions stored to the memory such that the processor adjusts the perspective of the user within the immersive 3-D environment in accordance with the user's motion (e.g., in accordance with the data indicative of the user's motion, detected by the motion sensor instrumentation, and received by the processor from the motion sensor instrumentation). Further still, the processor may execute instructions stored to the memory such that the 3-D visual representation fed to the visual instrumentation includes a data set selected by the user. For example, the data set may include a computer program that the user is analyzing and/or modifying. Specifically, the computer program may be rendered such that computer code is displayed in an X-Y plane of the immersive 3-D environment, while relationships between various portions of the code are displayed as representations along a Z direction of the immersive 3-D environment. However, other renderings are also possible and will be described in detail below.

Further, the system may include an input device (e.g., a data entry input device, such as a keyboard, a digital input screen, or the like). For example, the input device (e.g., data entry input device) may be a keyboard that facilitates the user's manipulation of the immersive 3-D environment and/or data within the immersive 3-D environment. In particular, the input device may enable the user to draft, edit, modify, or otherwise manipulate computer code that is fed to the visual instrumentation described above. As previously described, the data set selected by the user may be a computer program having computer code. By visualizing relationships and dependencies between various portions of code in the Z direction of the immersive 3-D environment (or in other axes of the immersive 3-D environment), which may not otherwise be possible in traditional configurations, the user may more readily modify the computer program via the input device to achieve desired goal(s) or intent(s) of the computer program. The input device (or another input device, such as a joystick or the previously described motion detection instrumentation) may also be utilized by the user to adjust a location or orientation of the user within the immersive 3-D environment (e.g., allowing the user to move closer or further from various virtual objects within the immersive 3-D environment, and/or allowing the user to shift or change the 3-D visual representation, as previously described).

To help illustrate, FIG. 1 is an embodiment of a system 10 for data (e.g., computer code) visualization and modification in an immersive 3-D environment. In the illustrated embodiment, the system 10 includes 3-D visual instrumentation 12, motion sensor instrumentation 14, and an input device 16 (or several input devices). It should be noted that the input device 16 may generally be a handheld input device, such as a keyboard or joystick, whereas other components of the system 10, such as the motion sensor instrumentation 14, may be non-handheld input devices. A user 18 may interact with each of the 3-D visual instrumentation 12, the motion sensor instrumentation 14, and the input device 16 (e.g., handheld input device). For example, the user 18 may perceive a portion of the immersive 3-D environment (e.g., a 3-D visual representation) via the visual instrumentation 12, the user 18 may adjust his or her perspective within the immersive 3-D environment via movement captured by the motion sensor instrumentation 14, and the user 18 may modify data (e.g., computer code) in the immersive 3-D environment via the input device 16 (e.g., handheld input device). It should be noted that, in some embodiments, the input device 16 may include or encompass talk-to-text software (e.g., a microphone and voice recognition/transcription software). In other words, while the input device 16 may generally be used as a data entry and/or zooming tool (e.g., in conjunction with, or separate from the motion sensor instrumentation 14), data entry and zooming functionality may be accomplished in certain embodiments via a non-handheld device capable of voice recognition. However, it should be noted that, in some embodiments, the input device 16 may include the microphone, and the processor 20 may include the voice recognition and/or talk-to-text technology.

In the illustrated embodiment, the 3-D visual instrumentation 12 may be goggles, glasses, or other instrumentation that facilitates visualization of a portion of the immersive 3-D environment (e.g., the 3-D visual representation thereof). Specifically, a processor 20 of the system 10 may execute instructions stored to a memory 22 of the system 10, where execution of one or more of the instructions causes the processor 20 to transmit one or more image or video feeds to the 3-D visual instrumentation 12. It should be noted that, in some embodiments, an additional (e.g., separate) service processor 21 may be included to receive and analyze relationship data (e.g., in XML, or in some other format), and to render the relationship data in a 3-D, as described below.

The 3-D visual instrumentation 12 may be a virtual reality tool, such as virtual reality goggles, that includes one display which receives a first image or video feed ("first feed") (e.g., associated with a user's right eye) and a second image or video feed ("second feed") (e.g., associated with a user's left eye). Alternatively, the 3-D visual instrumentation 12 (e.g., the virtual reality goggles) may include a first display that receives the first feed (e.g., associated with the user's right eye), and a second display that receives the second feed (e.g., associated with the user's left eye). The 3-D visual instrumentation 12 may also include first and second lenses corresponding with the first and second feeds (and, thus, the user's right and left eyes, respectively), where the first and second lenses are positioned between the user 18 and the display(s) on which the first and second feeds are produced. The first and second lenses may be positioned, angled, or otherwise designed (e.g., to include variable thickness, curves, etc.) to focus and/or reshape the first and second feeds, creating a stereoscopic 3-D image (or video).

The motion sensor instrumentation 14 may be incorporated into a single piece of hardware that includes the 3-D visual instrumentation 12, or the motion sensor instrumentation 14 may be stand-alone hardware. The motion sensor instrumentation 14 includes any suitable type of motion sensor that facilitates detection of 3-D motion of the user 18. In other words, the motion sensor instrumentation 14 may be capable of detecting motion of the user 18 in, and rotatably about, a first direction 24 (e.g., a Y-spatial dimension), a second direction 26 (e.g., an X-spatial dimension), a third direction 28 (e.g., a Y-spatial dimension), or any combination thereof. More specifically, the motion sensor instrumentation 14 may detect motion of the user's 18 head. As will be described in detail below, the system 10 facilitates correspondence of motion of the user's 18 head with a visual perspective (e.g., 3-D visual representation) within the immersive 3-D environment. Accordingly, as the user 18 turns or otherwise moves his or her head, a perspective of the user 18 (corresponding with the 3-D visual representation) within the immersive 3-D environment changes. In some embodiments, as previously described, the input device 16 may be utilized in conjunction with, or independently from, the motion sensor instrumentation 14 to change the 3-D visual representation, such as by zooming in and out.

The motion sensor instrumentation 14 may be communicatively coupled with the processor 20, such that the processor 20 receives feedback relating to (e.g., data indicative of) the user's 18 motion. The processor 20 may process the data indicative of the user's 18 motion and, upon executing instructions stored in the memory 22, may adjust the first and/or second feeds to the 3-D visual instrumentation 12, the first and/or second lenses of the 3-D visual instrumentation 12, or a combination thereof. In doing so, the processor facilitates a change of the user's 18 perspective (corresponding with the 3-D visual representation) within the immersive 3-D environment provided by the 3-D visual instrumentation. The processor 20 may be capable of changing the user's 18 perspective in real time to correspond with the user's 18 motion, such that the user 18 may predictably move to control his or her perspective within the immersive 3-D environment.

Further, the user 18 may modify data presented in the immersive 3-D environment by way of the input device 16 (e.g., handheld input device). For example, the input device 16 may be communicatively coupled with the processor 20, such that the user 18 may enter commands into the input device 16, and the commands are received by the processor 20. The input device 16 may be a keyboard or another device specially configured for data modification (e.g., computer coding or programming). As previously described, the input device 16 may include voice recognition capabilities such that the user 18 can program via spoken word transcribed into written code by the input device 16. Upon receiving the commands from the user 18 by way of the input device 16, the processor 20 may modify the first and/or second feeds to modify the data (e.g., computer code) in correspondence with the user's 18 commands. For example, the user 18 may edit a line of computer code via the input device 16, the processor 20 may receive the edit from the input device 16, and the processor 20 may cause the edits to be shown in the immersive 3-D environment (e.g., by way of the first and/or second feeds transmitted by the processor 20 to the 3-D visual instrumentation).

In some embodiments, the input device 16 may also be utilized to change a position of the user 18 within the immersive 3-D environment (e.g., a user's perspective within the immersive 3-D environment). For example, the user 18 may enter commands to the input device 16 that causes the user 18 to move toward, or away from, virtual objects (e.g., lines of code) disposed in the immersive 3-D environment (e.g., as a zooming tool). It should be noted that the input device 16 may include a corresponding virtual input device rendering within the immersive 3-D environment that corresponds with the input device's physical proximity to the user 18, such that the user 18 may perceive the input device 16 by way of the virtual input device rendering of the input device 16. In other words, the user 18 may adequately utilize the input device 16 without visualizing the physical input device 16, but rather by visualizing the virtual rendering of the input device 16 within the immersive 3-D environment. Of course, in some embodiments, the input device 16 (or one input device of several input devices) may be of a type that is of limited use to be rendered in the immersive 3-D environment, such as embodiments having voice recognition and/or talk-to-text software.

In accordance with present embodiments, at least one dimension of the immersive 3-D environment may be utilized to show relationships between data or code displayed in the immersive 3-D environment. As described above, either the processor 20, or the service processor 21 (e.g., additional or separate service processor), may receive relationship data (e.g., in XML or a similar format) and may render relationships associated with the relationship data in the immersive 3-D environment (e.g., in the at least one dimension of the immersive 3-D environment). Thus, the service processor 21 (or processor 20) may facilitate the ability to recognize a variety of relationship types via a configuration driven system and to transform that input into a common set of primitives that can then be rendered. Further, the service processor 21 (or processor 20) may include, stored or executed thereon, an algorithm for choosing the exact location of rendered objects based on their relationships between and amongst one another. The algorithm extends traditional force-based rendering algorithms to be able to incorporate overall motion of a world to enable 4-D rendering (e.g., 3-D+time) for dynamic systems.

Figure 2:
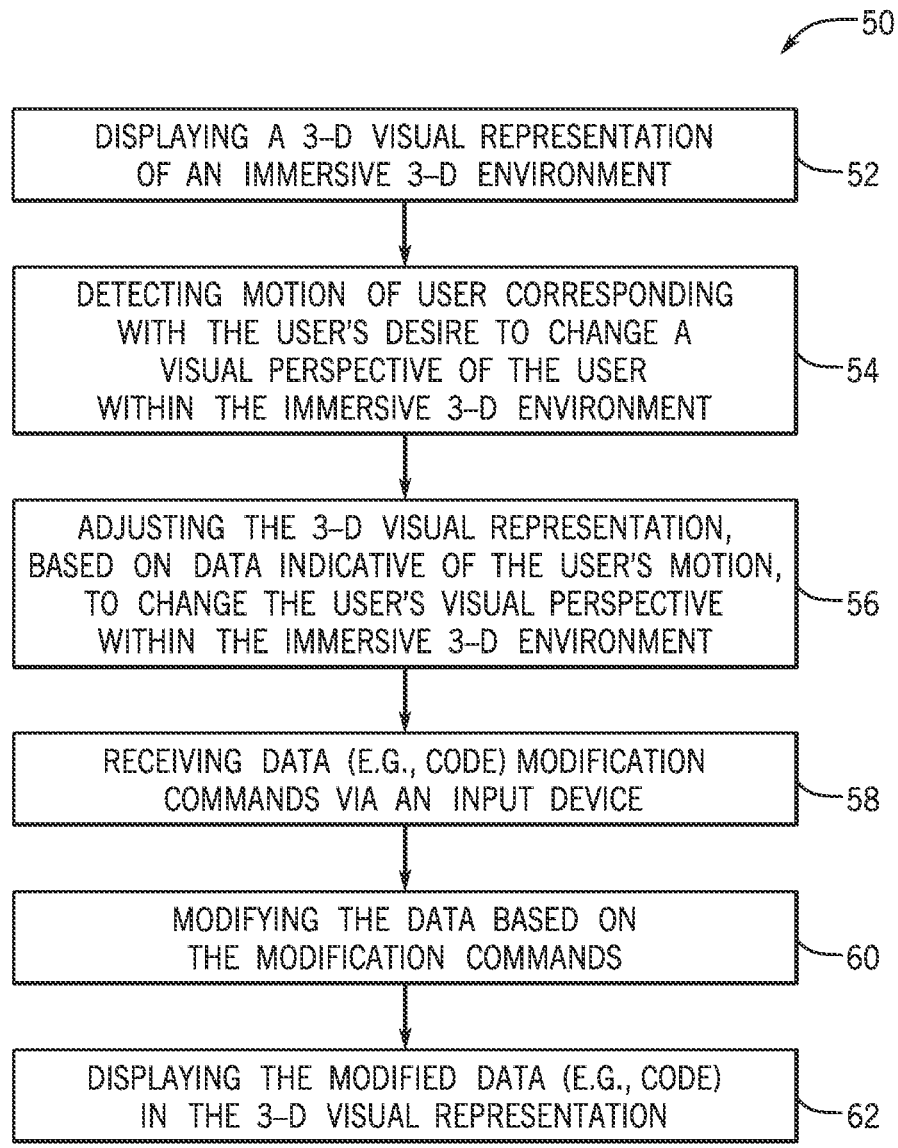
FIG. 2 is an embodiment of a method of providing the immersive 3-D data environment via the system of FIG. 1, in accordance with an aspect of the present disclosure.

FIG. 2 is an embodiment of a processor-based method 50 of providing the immersive 3-D environment via the system of FIG. 1. In the illustrated embodiment, the method 50 includes displaying (block 52) a 3-D visual representation of an immersive 3-D environment. For example, the 3-D visual representation may be a portion of the immersive 3-D environment corresponding with a perspective and/or location of the user within the immersive 3-D environment. In other words, while the immersive 3-D environment may include a 360 degree environment, the 3-D visual representation may include a portion (e.g., slice) of the 360 degree environment. The 3-D visual representation may be displayed on visual instrumentation (e.g., virtual reality goggles, glasses) in accordance with the system described with respect to FIG. 1. More specifically, a processor may execute instructions stored on a memory, where one or more of the executed instructions cause the processor to provide image or video feeds to the visual instrumentation. The image or video feed(s), in accordance with present embodiments, may include data (e.g., computer code) that is modifiable by the user. Further, the data (e.g., computer code) may include relationship information (e.g., displayed in a Z-axis of the 3-D visual representation) that would not otherwise be as readily available and/or perceivable in traditional configurations. For example, process relationships in accordance with the present disclosure may be displayed in the Z-axis of the 3-D visual representation, where the process relationships relate between various lines or portions of code displayed in an X-Y plane of the 3-D visual representation. Accordingly, the user may readily discern relationships between portions of code that may not otherwise be discernable or shown.

Further, the method 50 includes detecting (block 54) motion of the user corresponding with the user's desire to change a perspective (e.g., change the 3-D visual representation) within the immersive 3-D environment. For example, the user may be virtually immersed in the immersive 3-D environment, and may physically turn his or her head to change the user's visual (e.g., virtual) perspective within the immersive 3-D environment. A motion sensor may be incorporated into the virtual reality goggles worn by the user (or may be a stand-alone component fixed to the user's head), and the motion sensor may detect when the user moves his or her head. The motion sensor may send data indicative of the motion to a processor. As previously described, another input device (e.g., handheld input device), such as a joystick, a trigger, a switch, voice recognition technology, or the like, may be utilized as a zooming tool, although the motion sensor instrumentation may also be utilized as a zooming tool in conjunction with, or independently from, the handheld or voice recognition input device.

The method 50 also includes adjusting (block 56) the 3-D visual representation, based on the data indicative of the user's motion (and/or instruction via the handheld or voice recognition input device) described above, to change the user's visual (e.g., virtual) perspective within the immersive 3-D environment. For example, after receiving the data indicative of the user's motion (or other input, as described above), the processor may adjust the 3-D visual representation (e.g., the image or video feed[s]) transmitted to the visual instrumentation of the system. The adjustment may cause the 3-D visual representation to correspond with a desired visual perspective of the user within the immersive 3-D environment, where the desired visual perspective of the user corresponds with the user's movement (e.g., the motion of the user's head) or other input (e.g., via a handheld or voice recognition input device).

Further still, the method 50 includes receiving (block 58) data (e.g., code) modification commands via an input device (e.g., keyboard). For example, the user may view data (e.g., computer code and/or relationships) shown in the 3-D visual representation, and may enter additions, deletions, or revisions of the data (e.g., computer code) into the input device. The input device may communicate data indicative of the commands to the processor.

After receiving the data modification commands, the processor, in accordance with the present method 50, may modify (block 60) the data (e.g., code) in the immersive 3-D environment based on the modification commands. Further, the method 50 includes displaying (block 62) the modified data (e.g., code) in the 3-D visual representation provided to the user by way of the visual instrumentation (e.g., virtual reality goggles), assuming the user modifies data (e.g., code) within the 3-D visual representation (e.g., within the portion of the immersive 3-D environment being viewed by the user). Thus, the user is able to perform computer programming in real time within the immersive 3-D environment. As previously described, by incorporating the Z-axis in a way that facilitates observance of process relationships or other relationships between various portions of code displayed in the X-Y plane, the system may allow the user to more readily modify the code displayed in the X-Y plane to incorporate desired process relationships, revise or fix broken process relationships, omit undesired process relationships, and so on (e.g., as compared to traditional coding systems). It should be noted that the three dimensions may be utilized in other manners with respect to computer programming as well. For example, the computer code may be warped or bent in a 360 degree sheet surrounding the user's position within the immersive 3-D environment such that, as the user turns (e.g., via motion of the user's head) within the 3-D environment, the computer code is always tangential to the user's perspective. Other configurations may also be possible, and will be described in detail below.

Figure 3:
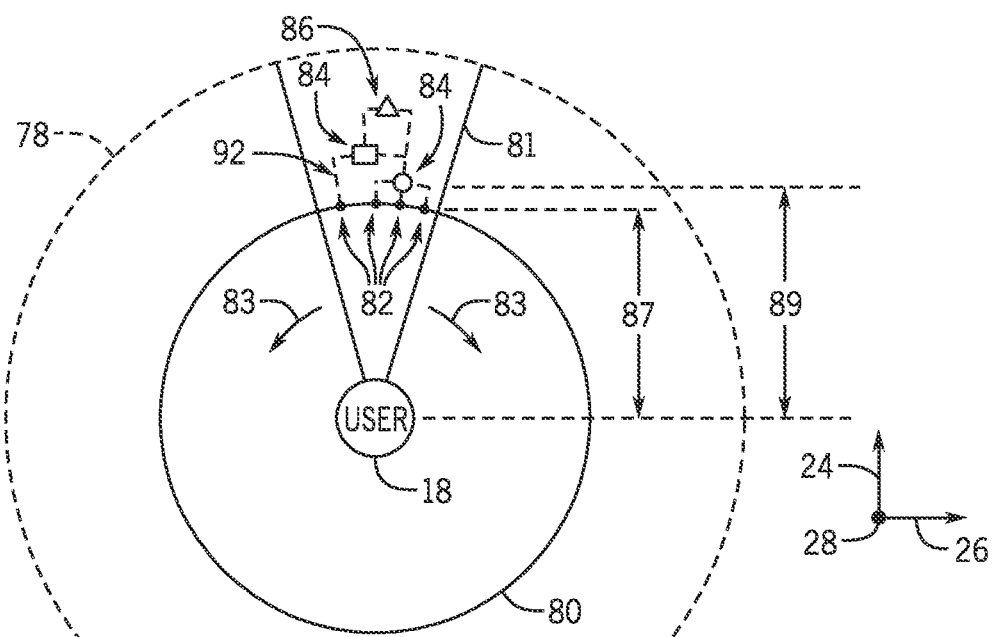
FIG. 3 is an overhead cross-sectional schematic illustration of an embodiment of the immersive 3-D data environment provided by the system of FIG. 1, in accordance with an aspect of the present disclosure.

Turning now to FIG. 3, an overhead cross-sectional schematic view of an embodiment of an immersive 3-D environment 78 is shown. In the illustrated embodiment, the user 18 is located in a center of the immersive 3-D environment 78. The user's 18 perspective within the immersive 3-D environment 78 is defined by a 3-D visual representation 81. For example, the 3-D visual representation 81 may be perceived by the user 18 through visual instrumentation (e.g., virtual reality goggles), as previously described. The user 18 may change the user's 18 perspective (and, thus, the 3-D visual representation 81 within the immersive 3-D environment 78) by turning, as shown by arrows 83 (although the user 18 may also look up and down, as described in FIG. 4). As previously described, motion detection instrumentation may detect the motion of the user 18, and may adjust the user's 18 visual perspective (e.g., the 3-D visual representation 81) accordingly. It should be noted that the user's 18 motion (and the corresponding modification of the 3-D visual representation) may be in, or rotatably about, any of the direction 24, 26, 28. It should also be noted that the motion detection instrumentation, or one or more separate input devices, may enable the user 18 to change the 3-D visual representation 81 in other ways, such as via zooming, as previously described.

As shown, data (e.g., computer code 80) may be displayed within the immersive 3-D environment 78. The computer code 80 may wrap circumferentially 360 degrees (or fewer degrees) about the user 18, where the user's 18 visualization of a portion of the code 80 (e.g., via the 3-D visual representation 81) is substantially flat (with slight curvature, as shown). The code 80 may be split along the 360 degrees into several pages of code 80. Within the portion of the code 80 viewable in the 3-D visual representation 81, several lines 82 (e.g., portions, segments) of the code 80 may exist. The lines 82 of code may be related to one another in any number of ways. For example, relationships may include process relationships, master-slave relationships, error relationships or other types of relationships. As a specific example, code associated with a particular sub-routine may have a particular shape with a particular color hovering behind the code in the immersive 3-D environment 78 such that the user 18 knows modification of the code will impact the sub-routine. For example, common colors and/or shapes may indicate a relationship. Additionally or alternatively, certain colors and/or shapes may indicate certain types of relationships (e.g., where a color or shape legend indicates which colors/shapes correspond with which types of relationships). The relationships may be perceivable within the immersive 3-D environment 78 via relationship indicators 84. Each relationship indicator 84 may include a different shape, color, or other identifying characteristic. As will be described below, the relationship indicators 84 (and corresponding relationships) may also be interrelated. Thus, secondary relationships 86 may also be included in the 3-D visual representation 81 within the immersive 3-D environment 78.

It should be noted that the relationship indicators 84 and/or secondary relationship indicators 86 may be viewable in any number of ways. For example, the code 80 may be transparent or translucent, and the relationship indicators 84, 86 may be viewable behind the code 80. In some embodiments, the user 18 may be situated above the code 80, and looking down and out toward the code 80, such that the user 18 may see relationship indicators 84, 86 behind the code 80 (e.g., via the user's overhead perspective of the code 80). In some embodiments, the code 80 may be angled toward the direction 28 (e.g., instead of extending directly in the direction 24), and the relationship indicators 84, 86 may be positioned on top of the code 80 and extending upwardly (e.g., directly) in the direction 24. In such embodiments, the relationship indicators 84, 86 may be transparent or translucent, such that the user 18 can see the relationship indicators 84, 86 and the code 80 behind the relationship indicators 84, 86. These and other possibilities will be described in detail below with respect to later figures.

Figure 4:
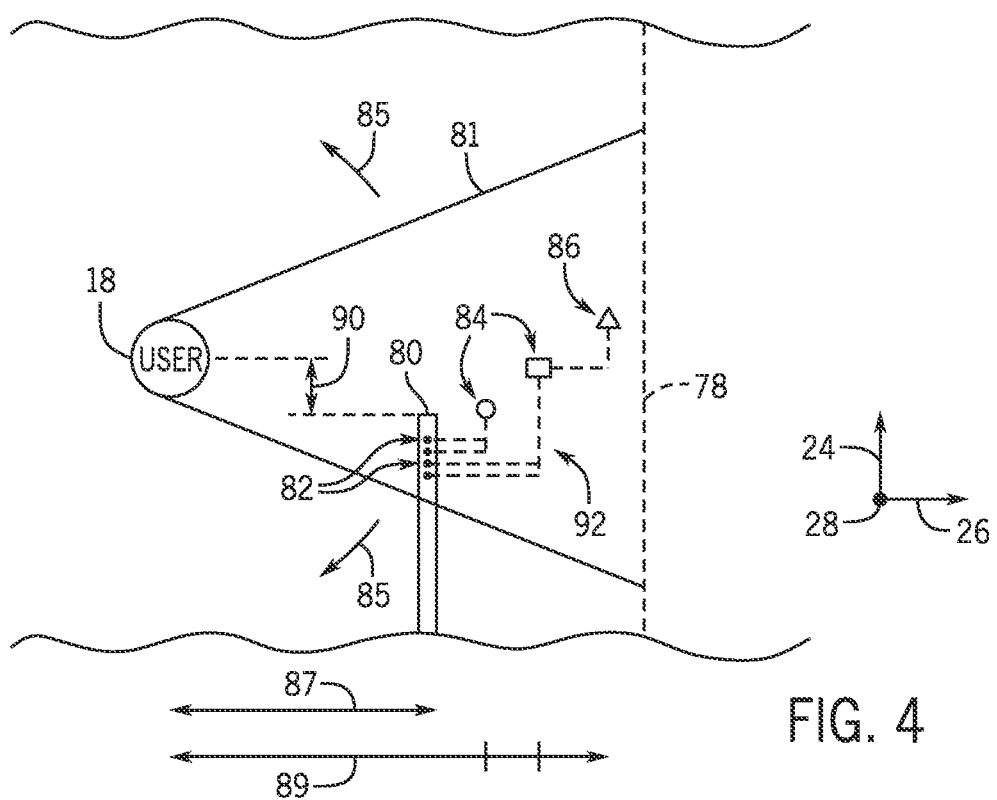
FIG. 4 is a side cross-sectional schematic illustration of an embodiment of the immersive 3-D environment provided by the system of FIG. 1, in accordance with an aspect of the present disclosure.

Turning now to FIG. 4, a side cross-sectional schematic view of an embodiment of the immersive 3-D environment 78 is shown. In the illustrated embodiment, the user 18 is positioned within the immersive 3-D environment 78 and views a portion (e.g., the 3-D visual representation 81) of the immersive 3-D environment 78. In the illustrated embodiment, the user 18 may adjust his or her perspective (e.g., corresponding with the 3-D visual representation 81) by turning his or her head about the direction 26 (e.g., indicated by arrows 85). As previously described, adjustments of the user's perspective (e.g., the 3-D visual representation 81) in other directions is also possible (e.g., as shown in FIG. 3).

In the illustrated embodiment, the user 18 is positioned at an offset 90 above the code 80. Accordingly, the user 18 can see behind the code 80. The relationship indicators 84, 86 may be in line with or, as shown, situated above the code 80. Accordingly, the user 18 may be able to see the lines 82 (e.g., segments) of the code 80, and which relationship indicators 84 correspond with the lines 82 of the code 80. Thus, the user 18 can see how various lines 82 of code relate to one another. Further, the user 18 can see secondary relationships via the secondary relation indicator(s) 86. It should be noted that ties 92 (e.g., lines) may be drawn between the lines 82 of code 80 and the relationship indicators 84, 86 to indicate which lines 82 of code 80 are related. In other embodiments, other features may be included to indicate which lines 82 of code 80 correspond with which relationship indicators 84, 86 (e.g., via color coding).

As shown in both of FIGS. 3 and 4, the relationship indicators 84, 86 (e.g., relationship data) may be disposed a distance from the user computer code 80 (e.g., along the direction 28). In other words, the computer code 80 may be disposed, in the immersive 3-D environment 78, a first distance 87 in the direction 28 from the user 18, and the relationship indicators 84, 86 (e.g., relationship data) may be disposed a second distance 89 from the user 18 different than the first distance 87. However, in some embodiments, the relationship indicators 84, 86 may be disposed closer to the user 18 than the code 80. Further, in some embodiments, the relationship indicators 84, 86 may be disposed at the same distance from the user 18 as the code 80, and the relationship indicators 84, 86 may be differentiated from the code 80 in some manner (e.g., color coding).

Figure 5:
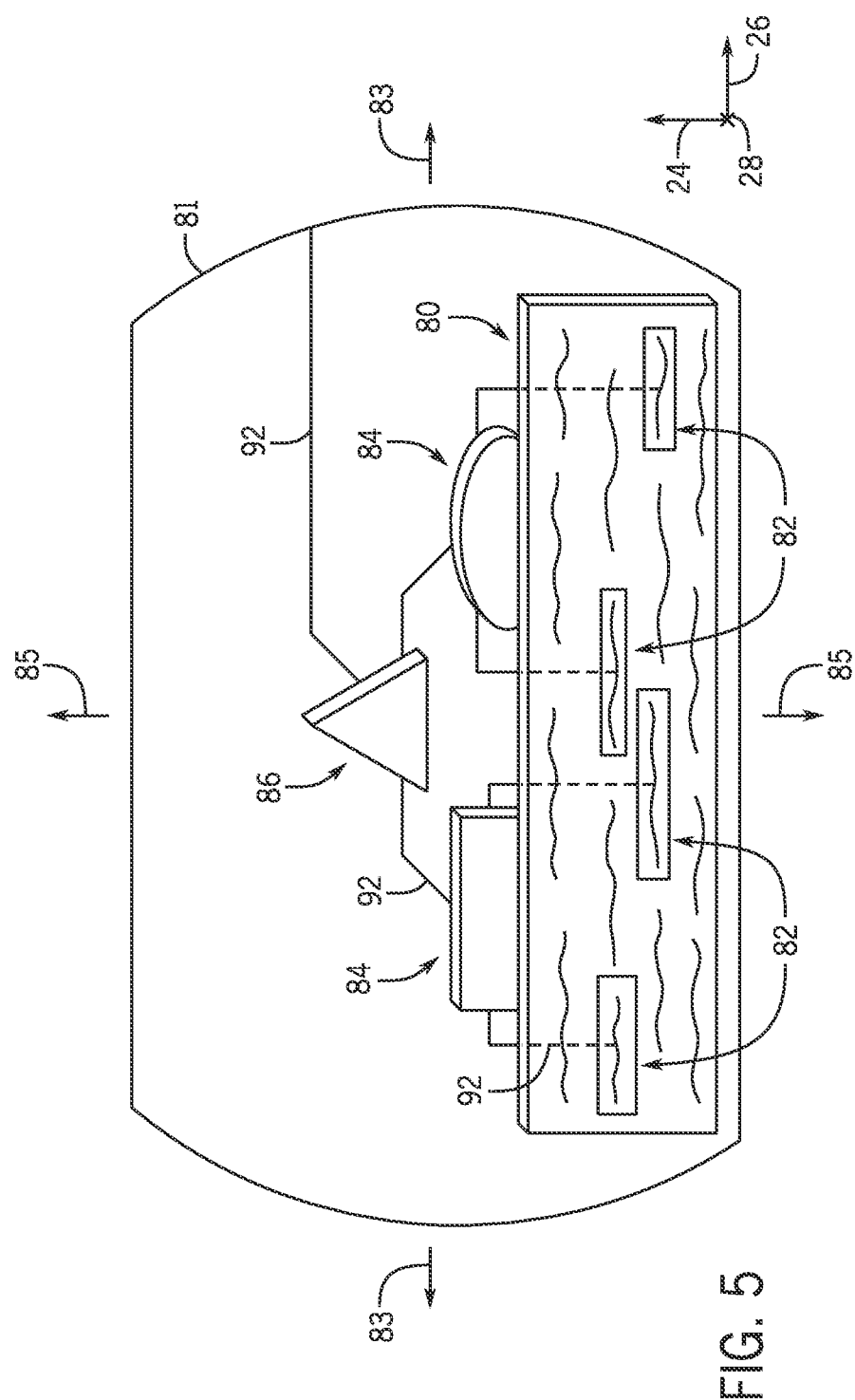
FIG. 5 is a perspective schematic illustration of an embodiment of the immersive 3-D environment provided by the system of FIG. 1 from a user perspective, in accordance with an aspect of the present disclosure.

Turning now to FIGS. 5-7, various user-perspective schematic illustrations of the 3-D visual representation 81 of a portion of an immersive 3-D environment are shown. The illustrated embodiments correspond with the view that a user may see when wearing visual instrumentation configured to show the 3-D visual representation 81. As previously described, the 3-D visual representations 81 include data (e.g., the code 80), relationship indicators 84 (e.g., corresponding with relationships between various lines 82 [segments, portions] of the code 80), and secondary relationship indicators 86. The user may adjust the 3-D visual representation 81 to adjust a portion of the immersive 3-D environment by moving his or her head (e.g., as indicated by arrows 83, 85).

In FIG. 5, the user may be positioned above or in line with a top 100 of the code 80, such that the user may see the relationship indicators 84, 86 behind the top 100 of the code 80. In such embodiments, the code 80 may be transparent or translucent, such that the relationship indicators 84, 86 (and/or the ties 92 thereof) are viewable through the code 80. In FIG. 6, the code 80 is angled between directions 28 and 24, and the relationship indicators 84, 86 may be disposed above the code 80. In FIG. 6, the relationship indicators 84, 86 and/or the ties 92 thereof may be transparent, such that the code 80 is viewable behind the relationship indicators 84, 86 and/or the ties 92. Additionally or alternatively, the relationship indicators 84, 86 may only be viewable by prompting by the user. In such embodiments, the relationship indicators 84, 86 and/or the ties 92 may be transparent or solid.

In FIG. 7, as previously described, the code 80 is transparent or translucent such that the relationship indicators 84, 86 (and/or the ties 92) are viewable through the code 80. It should be noted that in any of the embodiments illustrated in FIGS. 5-7, other features may be incorporated to enable the user to discern or observe relationships between the lines 82 (e.g., portions or segments) of the code 80 that may otherwise not be possible or may otherwise not be as functional in a traditional 2-D configuration. For example, the relationship indicators 84, 86 may be differentially color coded, and the colors may correspond with colors of the lines 82 of code 80 from which the corresponding relationships are inferred. Further, a depth of the relationship indicators 84, 86 may correspond with various features of the corresponding relationships (e.g., indicating various layers in a broader hierarchy of relationships or dependencies).

In accordance with present embodiments, relationships between various lines of code may include process relationships, error signifiers, method interactions, function interactions, library relationships, dependencies, stacktrace on error, and layering relationships. Other object-oriented programming relationships may include inheritance, interface implementation, dependency, composition, and encapsulation. Further, other relationships may include connections between message driven beans (e.g., code) and message queues (e.g., configurable items). Further still, other relationships may include runtime statistics regarding specific objects and portions of code (e.g., number of executions, average time per execution, etc.). Relationship visualization may facilitate the ability to step through (at a user specified speed or 'at will' by the user) multiple executing threads within a Java Virtual Machine (JVM) and various locking and synchronization techniques, such that the user may better understand and debug concurrent algorithms. Further, relationship visualization may facilitate the ability to step through code without synchronization algorithms in order to view the code run for each line of code to better understand the code for debugging.

Further, as previously described, at least one dimension of the immersive 3-D environment may be utilized to show relationships between data or code displayed in the immersive 3-D environment. As described above, either the processor, or the service processor (e.g., additional or separate service processor), may receive relationship data (e.g., in XML or a similar format) and may render relationships associated with the relationship data in the immersive 3-D environment (e.g., in the at least one dimension of the immersive 3-D environment). Thus, the service processor (or processor) may facilitate the ability to recognize a variety of relationship types via a configuration driven system and to transform that input a common set of primitives that can then be rendered, which may not otherwise be possible in a traditional 2-D scene. Further, the service processor (or processor) may include stored or executed thereon an algorithm for choosing the exact location to render the objects described above based on their relationships between and amongst one another. The algorithm extends traditional force-based rendering algorithms to be able to incorporate overall motion of a world to enable 4-D rendering (e.g., 3-D+time) for dynamic systems.

Further, in accordance with present embodiments, relationships between portions of data may include, but are not limited to: the topology between hardware on a given network, the changes (additions, modifications, deletions) of attributes connecting entities in fraud investigations, the genealogy of a given person connecting parent-child objects, and interactions between objects that show a relationship.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer programming system, comprising: three-dimensional (3-D) visualization instrumentation configured to display an immersive 3-D environment; and one or more processors configured to: receive computer code and one or more relationships between portions of the computer code; cause the 3-D visualization instrumentation to display a 3-D visual representation of the computer code on a vertical plane of the immersive 3-D environment; and cause the 3-D visualization instrumentation to display one or more relationship indicators indicative of the one or more relationships between the portions of the computer code at one or more positions offset relative to the vertical plane along a depth direction of the immersive 3-D environment.

2. The computer programming system of claim 1, wherein the one or more relationship indicators are offset from the 3-D visual representation of the computer code along a vertical direction of the immersive 3-D environment.

3. The computer programming system of claim 1, comprising motion detection instrumentation configured to detect a motion input.

4. The computer programming system of claim 3, wherein the one or more processors are configured to cause the 3-D visualization instrumentation to adjust the 3-D visual representation of the computer code based on the motion input.

5. The computer programming system of claim 3, wherein the motion detection instrumentation comprises a wearable device having a motion sensor.

6. The computer programming system of claim 1, comprising an input device configured to enable a modification to the computer code.

7. The computer programming system of claim 6, wherein the one or more processors are communicatively coupled to the input device and configured to apply the modification to the computer code and cause the 3-D visualization instrumentation to present the 3-D visual representation of the computer code with the modification to the computer code applied.

8. The computer programming system of claim 6, wherein the input device comprises a handheld input device.

9. The computer programming system of claim 6, wherein the input device comprises a microphone, and wherein the one or more processors is configured to implement the modification to the computer code using voice recognition technology, talk-to-text technology, or both.

10. The computer programming system of claim 6, wherein the one or more processors is configured to communicate a virtual position of a user within the immersive 3-D environment to the 3-D visualization instrumentation, wherein the virtual position of the user enables visualization of an area behind the computer code along the depth direction of the immersive 3-D environment, wherein the input device is configured to receive a change of position of the user, and wherein the 3-D visualization instrumentation is configured to adjust the 3-D visual representation of the computer code based on the change of position of the user.

11. The computer programming system of claim 1, wherein the 3-D visualization instrumentation is configured to display the 3-D visual representation of the computer code as transparent or translucent, and wherein the one or more relationship indicators are transparent, translucent, or both.

12. The computer programming system of claim 1, wherein the 3-D visualization instrumentation is configured to indicate a relationship type of each relationship indicator of the one or more relationship indicators, and wherein the relationship type of a respective relationship indicator of the one or more relationship indicators is indicated by displaying the respective relationship indicator as a certain color, shape, or both.

13. One or more tangible, non-transitory, machine-readable media, comprising machine-readable instructions for displaying an immersive three-dimensional (3-D) environment, the machine-readable instructions configured to cause one or more processors to: receive computer programming logic; generate a 3-D representation of the computer programming logic; instruct 3-D visualization instrumentation to display the 3-D representation of the computer programming logic on a vertical plane of the immersive 3-D environment; determine one or more relationships between portions of the computer programming logic; and instruct the 3-D visualization instrumentation to display one or more relationship indicators associated with the one or more relationships a distance away from the computer programming logic in a depth direction of the immersive 3-D environment.

14. The one or more tangible, non-transitory, machine-readable media of claim 13, comprising the machine-readable instructions configured to cause one or more processors to instruct the 3-D visualization instrumentation to display the one or more relationship indicators associated with the one or more relationships offset from the computer programming logic along a vertical direction of the immersive 3-D environment.

15. The one or more tangible, non-transitory, machine-readable media of claim 13, the machine-readable instructions configured to cause one or more processors to:
  receive motion input from motion detection instrumentation; and
  instruct the 3-D visualization instrumentation to adjust the 3-D representation of the computer programming logic based on the motion input.

16. The one or more tangible, non-transitory, machine-readable media of claim 13, wherein the machine-readable instructions are configured to cause one or more processors to:
  receive a modification to the computer programming logic from an input device;
  modify the computer programming logic based on the modification from the input device; and
  instruct the 3-D visualization instrumentation to adjust the 3-D representation of the computer programming logic with the modification applied.

17. A method of facilitating coding in an immersive three-dimensional (3-D) environment, comprising: receiving, via one or more processors, computer code and one or more relationships between portions of the computer code; generating, via the one or more processors, a 3-D visual representation of the computer code; causing, via the one or more processors, 3-D visualization instrumentation to display the 3-D visual representation of the computer code on a vertical plane of the immersive 3-D environment; and causing, via the one or more processors, the 3-D visualization instrumentation to display one or more relationship indicators indicative of the one or more relationships a distance away from the computer code along a depth axis of the immersive 3-D environment.

18. The method of claim 17, comprising positioning, via the one or more processors, a point-of-view of a user along a vertical axis of the immersive 3-D environment above the computer code to enable viewing of the one or more relationship indicators in front of or behind the computer code.

19. The method of claim 17, comprising causing, via the one or more processors, the 3-D visualization instrumentation to display the one or more relationship indicators in front of the computer code along the depth axis of the immersive 3-D environment.

20. The method of claim 17, comprising causing, via the one or more processors, the 3-D visualization instrumentation to display the one or more relationship indicators behind the computer code along the depth axis of the immersive 3-D environment.

* * * * *